United States Patent [19]

Morioka et al.

[11] 3,926,274
[45] Dec. 16, 1975

[54] FUEL TANK APPARATUS FOR A MOTORIZED TWO-WHEELED VEHICLE

[75] Inventors: Minoru Morioka, Niiza; Tetuo Mikami, Tokyo, both of Japan

[73] Assignee: Honda Giken Kogyo Kabushiki Kaisha, Tokyo, Japan

[22] Filed: Oct. 31, 1974

[21] Appl. No.: 519,698

[30] Foreign Application Priority Data
Nov. 2, 1973  Japan ............................. 48-122716

[52] U.S. Cl. ................. 180/35; 224/30 R; 280/202
[51] Int. Cl.² ...................................... B62D 63/04
[58] Field of Search ........... 180/35, 33 R, 33 A, 30; 280/202, 289, 5 A; 224/30 R, 31, 32 R

[56] References Cited
UNITED STATES PATENTS

| | | | |
|---|---|---|---|
| 675,393 | 6/1901 | Keating | 180/33 A |
| 2,011,016 | 8/1935 | Schiwinn | 280/202 |
| 2,109,316 | 2/1938 | Harley | 180/35 |
| 2,173,956 | 9/1939 | Roberts | 180/33 R |

FOREIGN PATENTS OR APPLICATIONS

| | | | |
|---|---|---|---|
| 521,070 | 3/1955 | Italy | 280/289 |
| 710,645 | 6/1954 | United Kingdom | 180/35 |
| 1,041,507 | 10/1953 | France | 180/35 |

*Primary Examiner*—Robert R. Song
*Assistant Examiner*—Jack D. Rubenstein
*Attorney, Agent, or Firm*—Waters, Schwartz & Nissen

[57] ABSTRACT

A fuel tank for a two-wheeled vehicle mounted between two spaced side frames within a chamber defined under the seat, in back of an engine and in front of a rear fender. The fuel tank corresponds in shape substantially to the shape of the chamber. The fuel tank is laterally encompassed between the side frames and is suspended from above by brackets fixed to the side frames.

6 Claims, 6 Drawing Figures

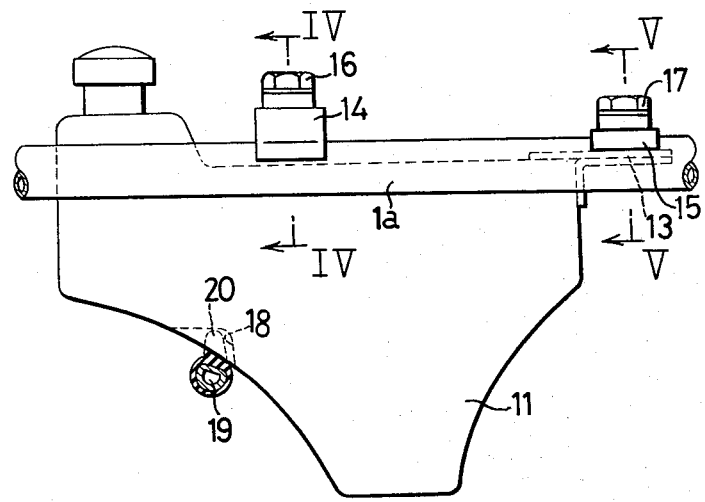
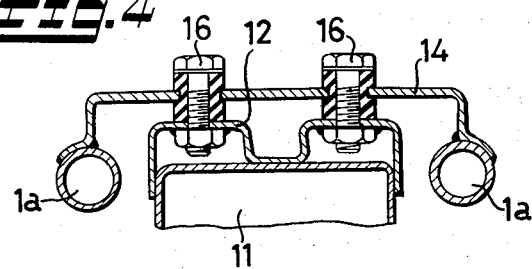
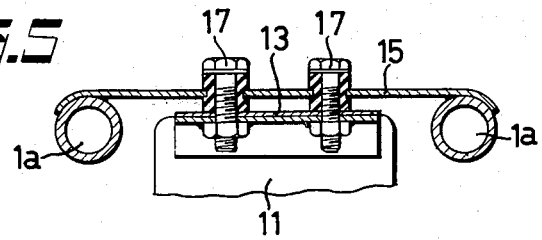
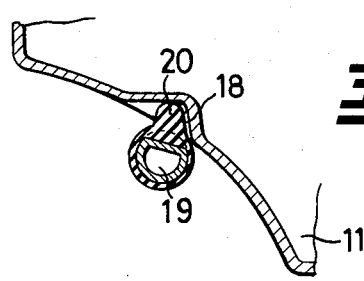

FUEL TANK APPARATUS FOR A MOTORIZED TWO-WHEELED VEHICLE

BACKGROUND

1. Field of the Invention

This invention relates to fuel tank apparatus for a motorized two-wheeled vehicle, such as a motorcycle.

2. Prior Art

It has been conventional in a two-wheeled vehicle for the fuel tank to be disposed between the steering handle at its front, and the driver's seat at its rear. It is also known to mount the fuel tank within a steel sheet frame disposed below the driver's seat. However, the former arrangement is disadvantageous in that the tank is liable to be damaged by impact on turnover of the vehicle since the tank is externally exposed, and also it is difficult to make the tank of large volume because it is located at a comparatively high position and consequently a change of volume thereof involves a change of position of the center of gravity of the vehicle body. An additional factor which precludes making the tank of large volume is that the shape of the tank is restricted from the balance thereof with the riding position of the driver. The mounting of the tank below the driver's seat has the disadvantage that the tank is largely restricted in shape and volume because it is mounted within the steel sheet frame.

SUMMARY OF THE INVENTION

An object of the invention is to provide a fuel tank apparatus free from the foregoing deficiencies.

According to this invention, in a motorized two-wheeled vehicle of the type having a vehicle body composed of a pipe frame, a front wheel, a rear wheel, a driver's seat on its upper surface, an internal combustion engine at its front lower portion and a fender for the rear wheel at its rear portion, there is provided within the pipe frame, a chamber bounded by the seat, the engine and the fender, the fuel tank having a shape substantially corresponding to that of the space in which it is contained and being fixedly mounted within the chamber.

According to a feature of this invention, the pipe frame constituting the vehicle body comprises a pair of left and right side frames having a space therebetween, said chamber being defined within said space.

BRIEF DESCRIPTION OF THE DRAWING

FIG. 3 is an enlarged side view of a major portion thereof;

FIGS. 4 and 5 are sectional views taken along lines IV — IV and V — V in FIG. 3, and FIG. 6 is a sectional view of a portion thereof.

DETAILED DESCRIPTION

Figure 1:
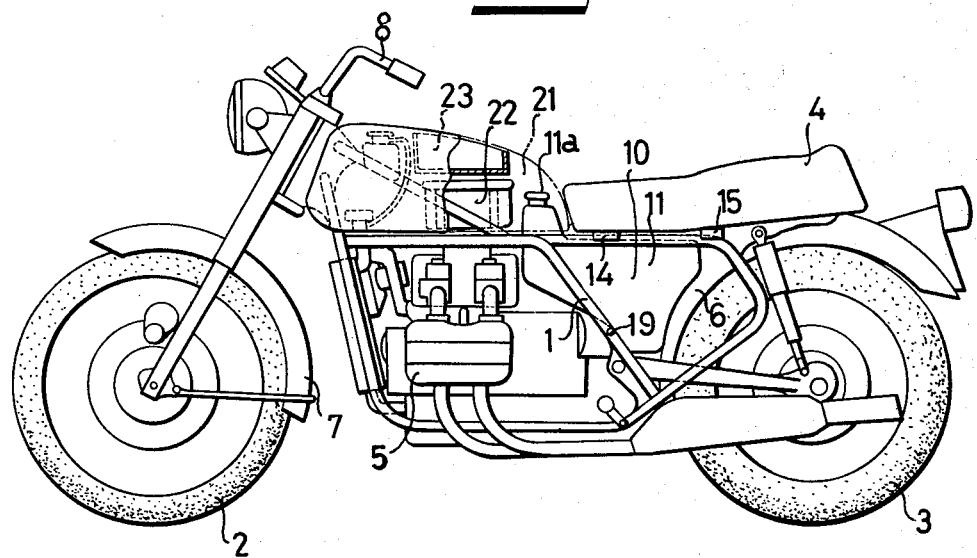
FIG. 1 is a side view of a motorcycle provided with an embodiment of the fuel tank apparatus according to this invention.
Figure 2:
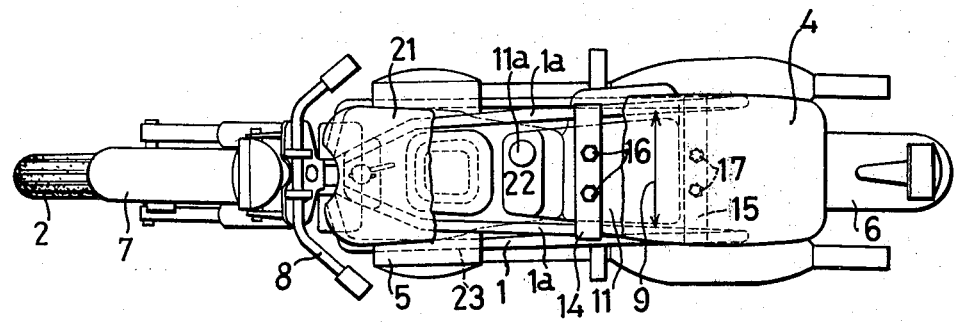
FIG. 2 is a top plan view, partly in section thereof.

Referring to the drawings, numeral 1 denotes the frame of a vehicle body composed of a pipe frame, and numerals 2 and 3 denote a front wheel and a rear wheel mounted at the front and rear of the frame. In almost the same manner as in a conventional two-wheeled vehicle, frame 1 has a driver's seat 4 on its upper surface, an internal combustion engine 5 at its front lower portion, a fender 6 at its rear portion for the rear wheel 3, a fender 7 at its front portion for the front wheel 2, and a steering handle 8 above the fender 7.

The pipe frame constituting the frame 1 of the vehicle body comprises a pair of left and right side frames 1a, having a space 9 therebetween, the internal combustion engine 5 being mounted in the front portion of the space 9.

A chamber 10 is bounded by the seat 4, the engine 5 and the fender 6 at the rear portion of the interior of space 9, and a fuel tank 11 having a contour that extends substantially along these bounding members 4,5,6 is contained within chamber 10 and is fixed in that position to the vehicle frame 1. The fuel tank extends as far downwardly as possible without interfering with rear wheel support and transmission apparatus.

The details of the fixing means for the fuel tank are shown in FIGS. 3 to 6. Therein, a pair of front and rear brackets 12,13 are seen to project from the upper surface of the fuel tank 11, and these brackets 12,13 are connected by means of respective bolts 16,17 to a pair of front and rear attaching brackets 14,15 each extending transversely between the side frames 1a, . For preventing left and right movements of the tank 11, the tank 11 is provided with a concavity 18 at its front surface, and a projection 20 of elastic material, such as rubber or the like, projects from a transverse member 19 extending in front thereof between the side frames 1a and is in engagement with concavity 18.

At the front upper portion of the frame 1 of the vehicle body, a frame housing 21 is secured nearly at the same position and of the same shape as a conventional fuel tank in front of the driver's seat in the conventional motorcycle, and it is so arranged that a fuel inlet 11a on the front upper surface of the fuel tank 11 and an air cleaner 22 connected to the intake side of the engine 5 are contained in the housing 21 and, an occasion demands, a tool-containing casing 23 or the like auxiliary casing can be fixed therein.

Thus, according to this invention, there is provided a chamber bounded by the seat, the engine and the rear fender within the pipe frame constituting the frame of the vehicle body, the fuel tank being housed and fixedly mounted within the chamber and substantially corresponding thereto in shape.

Accordingly, an advantageous arrangement is obtained because the fuel tank is not exposed to the exterior, and can be prevented from undergoing damage which might otherwise be caused by a collision or turnover of the vehicle. A further safety feature is that the mounting position of the fuel tank becomes comparatively low and the position of the center of gravity of the vehicle body is lowered so that the driving stability is improved. Furthermore, because of this position, it becomes possible to made the tank of large volume, and additionally the tank becomes less restrictive in its shape and volume than in the conventional arrangement where the tank is mounted within a steel sheet frame below the driver's seat.

What is claimed is:

1. In a motorized two-wheeled vehicle having a vehicle body composed of a pipe frame, a front wheel, a rear wheel, driver's seat in the frame, an internal combustion engine mounted at the front lower portion of the frame, and a fender for the rear wheel at the rear portion of the frame, an improvement wherein a fuel tank is mounted on said body, said pipe frame, seat, engine and fender defining a substantially enclosed chamber in which said fuel tank is fixedly secured, said fuel tank having a shape substantially conforming to the shape of said chamber; said pipe frame comprising a pair of left and right side frames having a space therebetween, said chamber being defined within said space, support means mounting said fuel tank from said side frames, said support means comprising a pair of spaced brackets secured to said side frames, and means suspending said fuel tank from said brackets, said fuel tank having a concavity therein at the front thereof, and resilient means supported from said side frames and engaged in said concavity.

2. An apparatus as claimed in claim 1 wherein said means suspending the fuel tank from the brackets comprises further brackets secured to the fuel tank and attaching means connecting the respective brackets and further brackets.

3. An apparatus as claimed in claim 1 wherein said resilient means comprises a transverse member extending between said side frames and an elastic member with a projection engaged in said concavity.

4. An apparatus as claimed in claim 1, comprising a housing secured to said body and disposed in front of said seat, said fuel tank having an inlet accessible through said housing.

5. An apparatus as claimed in claim 4, comprising an air cleaner for said engine within said housing.

6. An apparatus as claimed in claim 6, wherein said side frames laterally encompass said fuel tank.

* * * * *